United States Patent
Liu

(10) Patent No.: US 11,726,606 B2
(45) Date of Patent: Aug. 15, 2023

(54) TOUCH DETECTION METHOD, DRIVER AND TOUCH DISPLAY DEVICE

(71) Applicant: FocalTech Electronics (Shenzhen) Co., Ltd., Shenzhen (CN)

(72) Inventor: Weiping Liu, Shenzhen (CN)

(73) Assignee: FocalTech Electronics (Shenzhen) Co., Ltd., Shenzhen (CN)

( * ) Notice: Subject to any disclaimer, the term of this patent is extended or adjusted under 35 U.S.C. 154(b) by 134 days.

(21) Appl. No.: 17/610,218

(22) PCT Filed: Feb. 26, 2020

(86) PCT No.: PCT/CN2020/076832
§ 371 (c)(1),
(2) Date: Nov. 10, 2021

(87) PCT Pub. No.: WO2021/022804
PCT Pub. Date: Feb. 11, 2021

(65) Prior Publication Data
US 2022/0253191 A1    Aug. 11, 2022

(30) Foreign Application Priority Data

Aug. 8, 2019 (CN) .......................... 201910731800.3

(51) Int. Cl.
*G06F 3/041* (2006.01)
(52) U.S. Cl.
CPC ........ *G06F 3/04166* (2019.05); *G06F 3/0412* (2013.01)

(58) Field of Classification Search
CPC .................. G06F 2203/04104; G06F 3/04166
See application file for complete search history.

(56) References Cited

U.S. PATENT DOCUMENTS

| | | | |
|---|---|---|---|
| 10,481,718 B2 | 11/2019 | Ding et al. | |
| 2014/0071066 A1* | 3/2014 | Lee | G06F 3/04166 345/173 |
| 2019/0171320 A1* | 6/2019 | Kim | G06F 3/0443 |
| 2020/0004367 A1* | 1/2020 | Lee | G06F 3/038 |

FOREIGN PATENT DOCUMENTS

| | | |
|---|---|---|
| CN | 107861651 A | 3/2018 |
| CN | 109407874 A | 3/2019 |

* cited by examiner

*Primary Examiner* — Robin J Mishler
(74) *Attorney, Agent, or Firm* — ScienBiziP, P.C.

(57) ABSTRACT

A touch control method applied in a touch device, the touch display working during a plurality of display frames, a first-type blank period being between each two adjacent display frames, and each of the plurality of display frames comprising at least one second-type blank period and at least one third-type blank period; the touch detection method comprising: detecting a touch operation of a first touch object in at least one of the first-type blank period; judging whether a second touch object being detected in the at least one second-type blank period; and according to a result of the judging, detecting the touch operation of the first touch object or/and the second touch object in at least parts of the at least one third-type blank period. A driver and a touch display device is also provided.

15 Claims, 9 Drawing Sheets

TOUCH DETECTION METHOD, DRIVER AND TOUCH DISPLAY DEVICE

TECHNICAL FIELD

The present disclosure generally relates to touch display technology, particularly relates to a touch detection method, a driver achieving the touch detection method, and a touch display device.

BACKGROUND

More and more intelligent devices (such as mobile phones and tablet computers) assembled a display function and a touch function. A method for achieving the display function and the touch function is that display electrodes in the intelligent devices work in a time-division manner. That is, the intelligent devices achieve the display function and the touch function in different time period.

Touch methods in the art including a way of using an active touch object to touch and a way of using a passive object to touch. The active touch object may be an active stylus which can transmit a scanning signal actively. The scanning signal from the active stylus can be detected and received by the intelligent device when the active stylus touches the intelligent devices. The passive touch object may be a finger or a passive stylus which cannot transmit a scanning signal. The intelligent devices transmit a scanning signal when the finger touches the intelligent devices. Therefore, the intelligent devices detect touch operations of the active touch object and the passive object in different ways. For an intelligent device which can detect both the touch operations of the active touch object and the passive object, a working method is to detect a touch operation of the active touch object, detect a touch operation of the passive touch object, and display images in a time-division manner in a working cycle. It means the intelligent devices detect touch operation twice (detect a touch operation of the active touch object and detect a touch operation of the passive touch object) in each working cycle even there is no active touch object touching, which is not conducive to saving power consumption of the intelligent devices.

SUMMARY

One aspect of the present disclosure provides a touch detection method applied in a touch display device, the touch display working during a plurality of display frames, a first-type blank period being between each two adjacent display frames, and each of the plurality of display frames comprising at least one second-type blank period and at least one third-type blank period;

the touch detection method comprising:
  detecting a touch operation of a first touch object in at least one of the first-type blank period;
  judging whether a second touch object being detected in the at least one second-type blank period; and
  according to a result of the judging, detecting the touch operation of the first touch object or/and the second touch object in at least parts of the at least one third-type blank period, wherein the at least one second-type blank period and the at least parts of the at least one third-type blank period are in a same display frame.

Another aspect of the present disclosure provides a driver applied in a touch display device working during a plurality of display frames, a first-type blank period being between each two adjacent display frames, each of the plurality of display frames comprising at least one second-type blank period and at least one third-type blank period;

the driver comprising:
  a first detection module configured to detect a touch operation of a first touch object in at least one of the first-type blank period;
  a judging module configured to judge whether a second touch object being detected in the at least one second-type blank period; and
  a second detection module configured to detect the touch operation of the first touch object or/and the second touch object in at least parts of the at least one third-type blank period according to a result of the judging, wherein the at least one second-type blank period and the at least parts of the at least one third-type blank period are in a same display frame.

Another aspect of the present disclosure provides a touch display device working during a plurality of display frames, a first-type blank period being between each two adjacent display frames, each of the plurality of display frames comprising at least one second-type blank period and at least one third-type blank period, the touch display device comprising:
  a touch display module; and
  a driver configured to detect a touch operation of a first touch object in at least one of the first-type blank period, judge whether a second touch object is detected in the at least one second-type blank period, and detect the touch operation of the first touch object or/and the second touch object in the at least one third-type blank period according to a result of the judging, wherein the at least one second-type blank period and the at least one third-type blank period are in a same display frame;
  wherein the driver drives the touch display device to display images in the plurality of display frames except the at least one second-type blank period and the at least one third-type blank period.

The touch detection method provided by embodiments of the present disclosure is applied to a touch display device. The touch display device works during a plurality of display frames. By configuring a first-type blank period between each two adjacent display frames, configuring at least one second-type blank period and at least one third-type blank period in each display frame, detecting touch operation of a first touch object in the at least one first-type blank period, and making the at least one third-type blank period to detect the touch operation of the first touch object or/and a second touch object according to a result of judging of the second-type blank period judging whether the second touch object is detected, the touch display device detecting the touch operation of the first touch object and the second touch object in a time-division manner is achieved. And a touch detection method (detecting the touch operation of the first touch object or/and the second touch object) of the third-type blank period can be configured according to actual conditions, which is conducive to set an acting method of the touch display device reasonably according to the actual conditions and save power consumption of the touch display device.

| | | |
|---|---|---|
| Touch display device | | 10, 20 |
| Substrate | | 11 |
| Display area | | 111 |
| Non-display area | | 112 |
| Gate driver | | 12 |
| Source driver | | 13 |
| Touch detection driver | | 14 |
| Gate line | | G1-Gm |
| Data line | | D1-Dn |
| Common electrode | | 15 |
| Top glass substrate | | 16 |
| Polarizer | | 17 |
| Protection cover | | 18 |
| Display frame | | $T_{display}$ |
| Sub-display frame | | $t_{display}$ |
| First-type blank period | | T1 |
| First sub-period | | T11 |
| Second sub-period | | T12 |
| Second-type blank period | | T2 |
| Third-type blank period | | T3 |
| Working cycle | | T |
| Step | | S1, S2, S3 |
| Touch display module | | 21 |
| Driver | | 22 |
| First detection module | | 221 |
| Judging module | | 222 |
| Second detection module | | 223 |

The following specific embodiments will further illustrate the present disclosure in conjunction with the above drawings.

DETAILED DESCRIPTION

Embodiment 1

A touch detection method in the present embodiment is applied to a touch display device. The touch display device may be intelligent devices assembled display function and touch function such as computers, tablets, mobile phones and so on.

Figure 1:
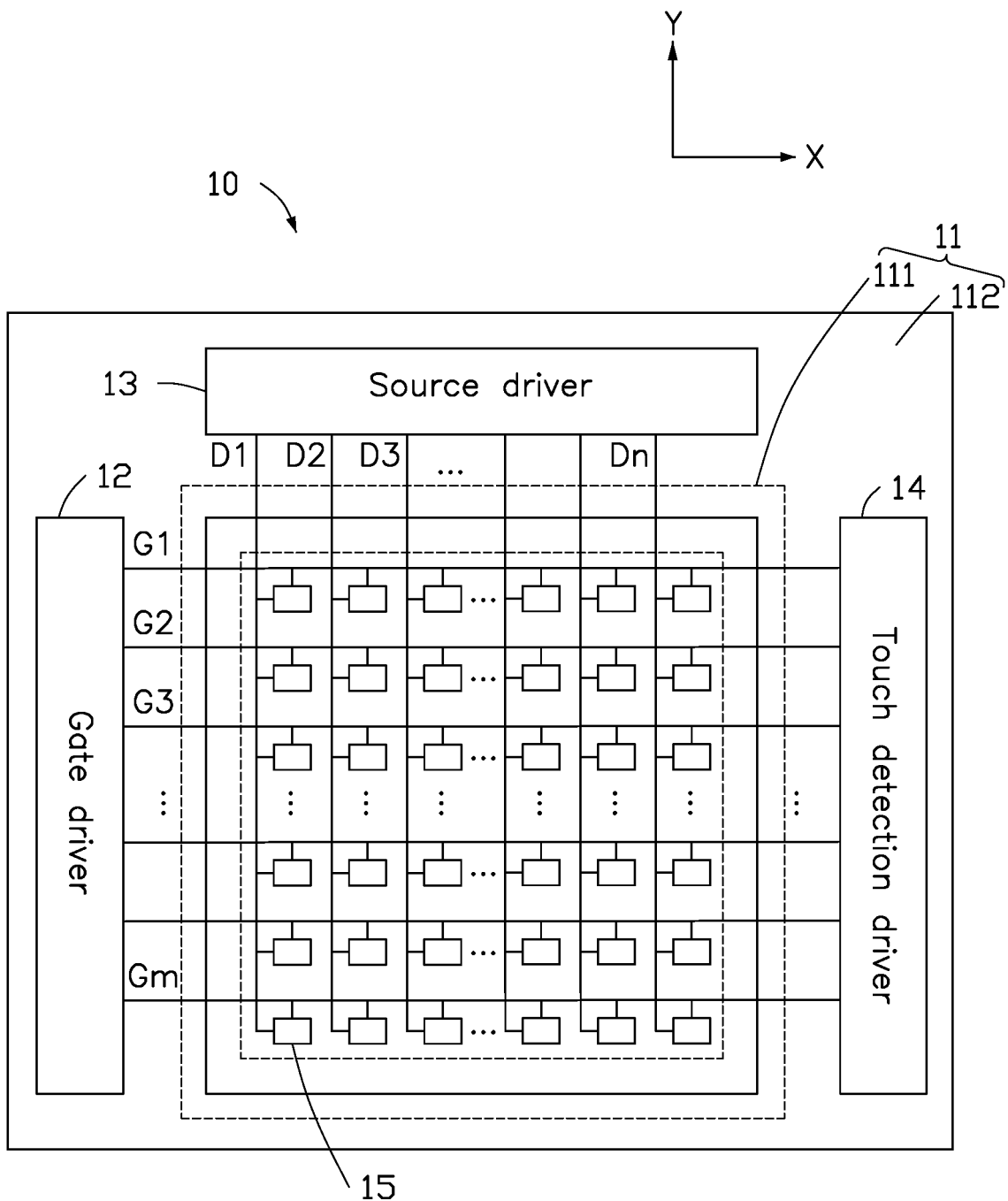
FIG. 1 is a schematic diagram of a planar structure of a touch display device in a first embodiment of the present disclosure.

Please refer to FIG. 1, the touch display device 10 includes a substrate 11. The substrate 11 is a thin-film transistor (TFT) substrate. The substrate 11 defining a display area 111 and a non-display area 112 surrounding the display area 111. The display area 111 is configured to display images, and the non-display area 112 is configured to arrange electrical elements (such as touch detection driver and display driver), wires and so on. The touch display device 10 further includes a gate driver 12, a source driver 13, and a touch detection driver 14 in the non-display area 112. A plurality of gate lines G1-Gm parallel and a plurality of data lines D1-Dn parallel are on the substrate 11. The gate lines G1-Gm and the data lines D1-Dn cross. The gate driver 12 electrically connected to the gate lines G1-Gm, wherein the gate driver 12 transmits a gate scanning signal to the gate lines G1-Gm in a sequence of the gate line G1 to the gate line Gin when the touch display device 10 displays the images. The source driver 13 electrically connected to the data lines D1-Dn to send transmit a data signal to the data lines D1-Dn simultaneously. The gate driver 12 and the source driver 13 achieve displaying images of the touch display device 10 by a way of above.

Please continue to refer to FIG. 1, the touch display device 10 further includes a plurality of common electrodes 15 in a plurality of areas formed by the gate lines G1-Gm and the data lines D1-Dn crossing. The common electrodes 15 are arranged in an array and are electrically connected to the touch detection driver 14, respectively. The common electrodes 15 are applied a common voltage when the touch display device 10 display images, and the common electrodes 15 are as touch electrodes and applied a touch scanning signal when the touch display device 10 performs touch detection.

Figure 2:
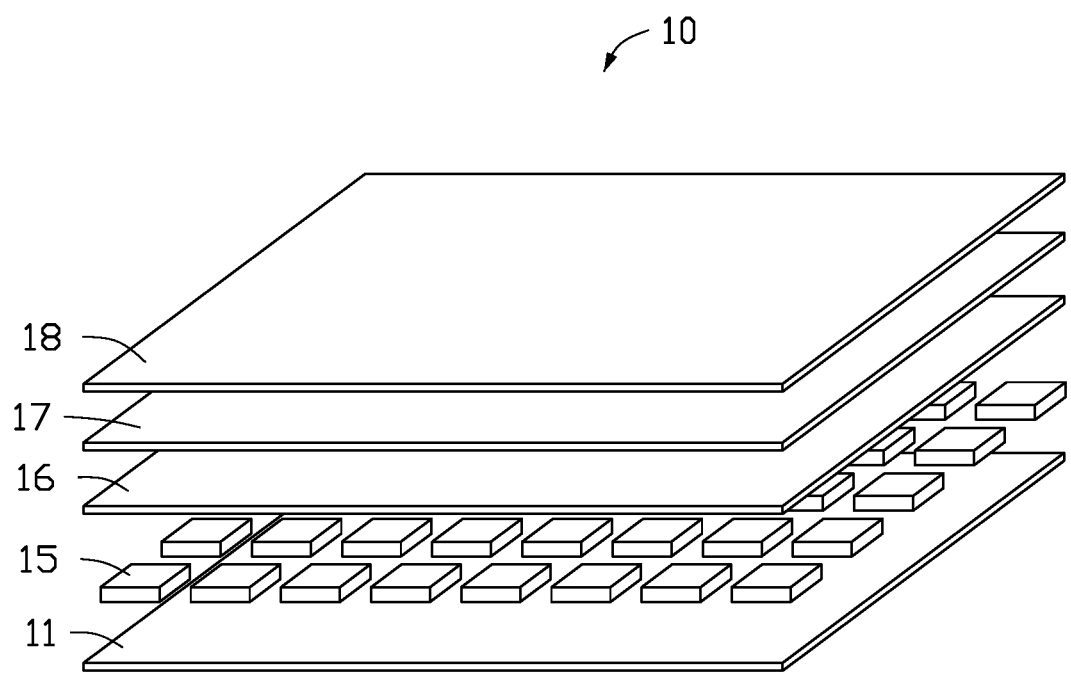
FIG. 2 is a schematic diagram of a three-dimensional structure of the touch display device in the first embodiment of the present disclosure.

Please refer to FIG. 2, the touch display device 10 in the present embodiment further includes a top glass substrate 16, a polarizer 17, and a protection cover 18 stacked in sequence. The substrate 11 is one a side of the top glass substrate 16 away from the protection cover 18. The common electrodes 15 are between the substrate 11 and the top glass substrate 16. A surface of the protection cover 18 is as a surface of the touch display device 10 for receiving a touch operation.

Figure 3:
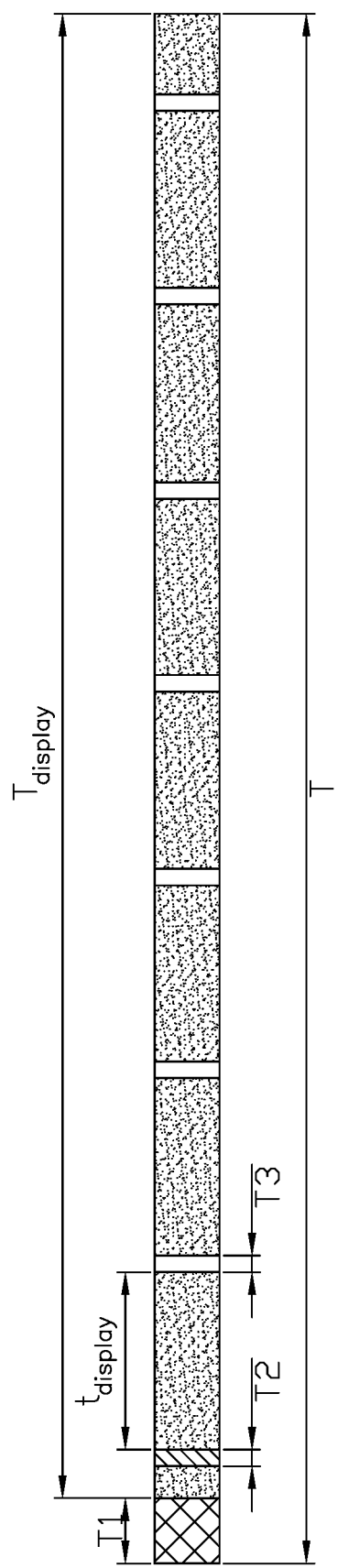
FIG. 3 is a schematic diagram of a touch detection method in a working cycle in the first embodiment of the present disclosure.

Please refer to FIG. 3, the touch display device 10 works in a plurality of display frames $T_{display}$ when performing image display. That is, the touch display device 10 is configured to display dynamic images including a plurality of images, wherein each display frame $T_{display}$ is defined as a duration for displaying one of the images. Please refer to FIG. 1 and FIG. 3 together, one display frame corresponds to a duration of the gate driver 12 complete scanning all of the gate lines G1-Gm. There is a first-type blank period T1 between every two adjacent display frames $T_{display}$.

Please continue to refer to FIG. 1 and FIG. 3 together, dividing all the gate lines G1-Gm into a plurality of groups when the gate driver 12 scanning the gate lines G1-Gm, wherein gate lines in each group are arranged consecutively. There is a time interval between scanning two adjacent groups of gate lines. Defining a period for completing scanning one group of gate lines as a display sub-frame $t_{display}$ and defining the time interval as a second-type blank period T2 or a third-type blank period. T3. Therefore, each display frame $T_{display}$ includes a plurality of display sub-frames $t_{display}$, there is the second-type blank period T2 or the third-type blank period T3 between every two adjacent display sub-frame $t_{display}$, and each display frame $T_{display}$ includes at least one second-type blank period T2 and at least one third-type blank period T3. The touch display device 10 performs image display and touch detection in a time-division manner. Specifically, the touch display device 10 performs image display in each display sub-frame $t_{display}$ and performs touch detection in each first-type blank period T1, each second-type blank period T2, and each third-type blank period T3.

A touch detection function of the touch display device 10 supports detection a touch operation of a first touch object (not shown) and a touch operation of a second touch object (not shown), wherein the first touch object is an object that cannot actively send a touch scanning signal, that is, the first touch object is a passive touch object. The touch display device 10 needs to actively send a touch scanning signal when the first touch object is touching the touch display device 10. For example, the first touch object is a finger. The second touch object can actively send a touch scanning signal and can receive a touch scanning signal sent by the touch display device 10, that is, the second touch object is an active touch object. For example, the second touch object is an active stylus.

In the present embodiment, defining each display frame $T_{display}$ and one most adjacent first-type blank period T1 preceding the display frame $T_{display}$ together as a working cycle T. working process of the touch display device 10 in each working cycle is the same. The following will describe the working process of the touch display device 10 in a plurality of consecutive working cycles T.

Figure 4:
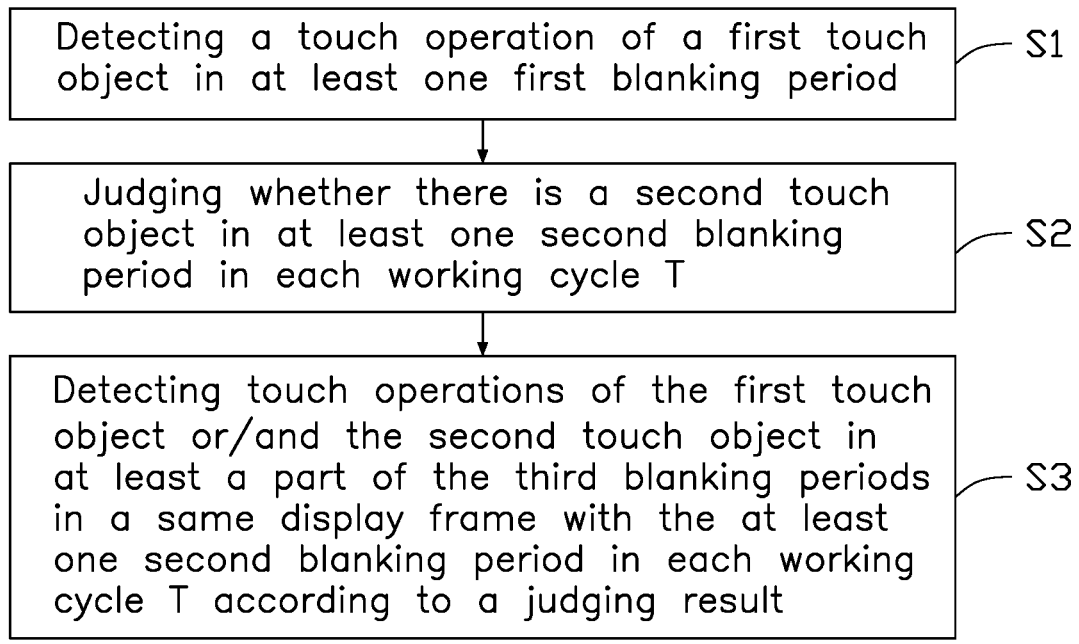
FIG. 4 is a flow chart of the touch detection method in the first embodiment of the present disclosure.

Please refer to FIG. 4, the touch detection method in the present embodiment including:

step S1, detecting a touch operation of a first touch object in at least one of the first-type blank period;

step S2, judging whether a second touch object being detected in the at least one second-type blank period in each of the working cycle T; and step S3, according to a result of the judging, detecting the touch operation of the first touch object or/and the second touch object in at least parts of the at least one third-type blank period, wherein the at least one second-type blank period and the at least parts of the at least one third-type blank period are in a same display frame.

Please refer to FIG. 3 again, in the present embodiment, each display frame $T_{display}$ includes 9 display sub-frames $t_{display}$, 1 second-type blank period T2, and 7 third-type blank periods T3, wherein the second-type blank period T2 precedes all the third-type blank periods T3 and each second-type blank period T2 and each third-type blank period T3 are between two adjacent display sub-frame $t_{display}$.

Please refer to FIG. 1 and FIG. 3 together, in the step S1, the touch detection driver 14 transmits the touch scanning signal to each common electrode 15 in at least one first-type blank period T1 to detect the touch operation of the first touch object. In the meantime, it can completely detect the touch operation of the first touch object once in the first-type blank period T1. Since the touch display device 10 provided by the present embodiment does not need to detect the touch operation of the first touch object in every first-type blank period T1, the touch display device 10 is vacant in the first-type blank period T1 if not detecting the touch operation of the first touch object in the first-type blank period T1, that is, the touch display device 10 does not perform any operations in the first-type blank period T1.

In the step S2, judging whether a second touch object is detected in the second-type blank period T2 in each working cycle T.

In the present embodiment, the common electrodes 15 are arranged in an array. The common electrodes 15 form a plurality of rows arranged in a X direction and a plurality of columns arranged in a Y direction in a time-division manner, wherein two adjacent common electrodes 15 in a same row are electrically connected, and two adjacent common electrodes 15 in a same column are electrically connected.

Specifically, common electrodes 15 form a plurality of rows arranged in the X direction in the step S2, wherein the touch detection driver 14 transmits the touch scanning signal to scan each row of common electrodes 15 to judge whether the second touch object is detected in a current time. In the present embodiment, to determine a specific coordinate of the second touch object, it is necessary to scan each row of common electrodes 15 to determine a coordinates in a first dimension of the second touch object, and then to scan each column of common electrodes 15 to determine a coordinates in a second dimension of the second touch object, so as to finally determine the specific coordinate of the second touch object (in other embodiments, it can scan each column of common electrodes 15 first and then scan each row of common electrodes 15). In step S2, it is only necessary to judge whether the second touch object is detected and obtain the coordinates in the first dimension without determining the specific coordinate of the second touch object. Therefore, it is not necessary to perform a complete touch detection, and just need to select each row of common electrodes 15 or each column of common electrodes 15 to scan.

In step S3, determining working methods of each third-type blank period T3 belonging to a same display frame $t_{display}$ with the second-type blank period T2 in each working cycle T according to the result of judging.

Please refer to FIG. 1 and FIG. 3 together, if it is determined that there is the second touch object in the step S2, the above 7 third-type blank periods T3 are all used to detect the touch operation of the second touch object. Since it needs to scan each row and each column of common electrodes 15 to determine the specific coordinate of the second touch object, and one third-type blank period T3 can only complete scanning each row or each column of common electrodes 15, two third-type blank periods T3 are needed to complete detecting the touch operation of the second touch object together. Wherein, detecting the touch operation of the second touch object can be completed once in a first third-type blank period T3 and an adjacent second-type blank period T2 in the display frame $T_{display}$, and the subsequent 6 third-type blank periods T3 are divided into three groups, two third-type blank periods T3 in each group are adjacent, and detecting the touch operation of the second touch object can be completed once in each group.

It can be seen that if the first-type blank period T1 in the step S1 detects the touch operation of the first touch object once and it is judged the second touch object is detected in the step S2, the touch operation of the first touch object can be detected once in one working cycle T, the touch operation of the second touch object can be detected four times in one working cycle T, and one frame of image can be displayed in one working cycle T. According to working processes in one working cycle T above, a frequency of detecting the touch operation of the first touch object is 60 Hz and a frequency of detecting the touch operation of the second touch object is 240 Hz if a frequency of the touch display device 10 displaying images is 60 Hz. In the present embodiment, the first touch object is a finger, and the second touch object is an active stylus. Since an operation of the active stylus is faster than an operation of the finger, the frequency of detecting the touch operation of the active stylus is required to be higher than the frequency of detecting the touch operation of the finger to get a better touch experience. Therefore, in the present embodiment, the frequency (240 Hz) of detecting the touch operation of the second touch object is four times of the frequency (60 Hz) of detecting the touch operation of the first touch object, which is conducive to improving the touch experience.

Further, in the second-type blank period T2 of a current working cycle T, according to a way of scanning each row of common electrodes 15, it can not only judge whether the second touch object is detected, but also complete detecting the touch operation of the second touch object with an adjacent third-type blank period T3 once in a condition of there being the second touch object. That is, the second-type blank period T2 is not only configured to judge whether the second touch object is detected, but also configured to detect the operation of the second touch object, which is conducive to save a time for touch detection.

Further, each working cycle T has a same duration. In one working cycle T, a time interval between the second-type blank period T2 and a third-type blank period T3 closest to the second-type blank period T2 is the same as time intervals between each adjacent third-type blank period T3. Therefore, time intervals between every two adjacent times of detecting the touch operation of the first touch object are the same as time intervals between every two adjacent times of detecting the touch operation of the second touch object. That is, the touch display device 10 performs the touch detection evenly for a better user experience.

Figure 5:
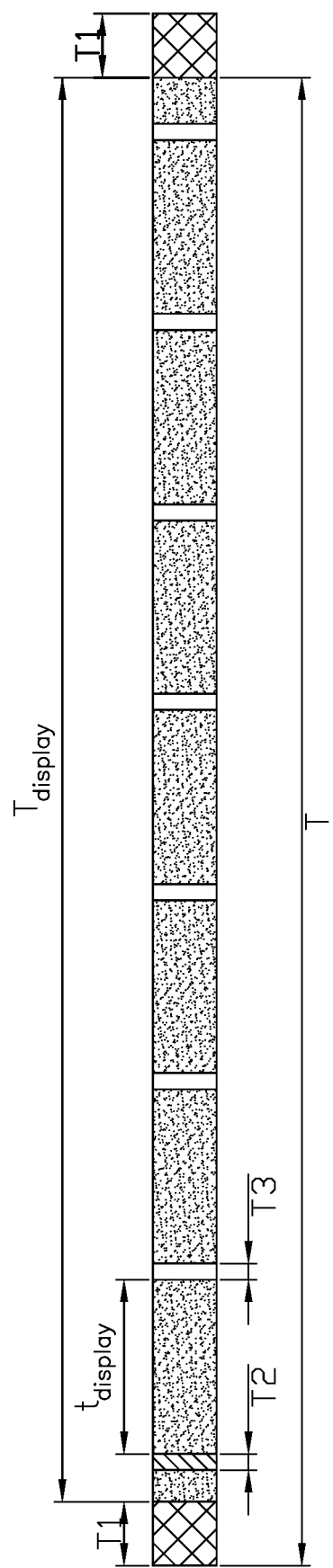
FIG. 5 is a schematic diagram of another touch detection method in the present disclosure.

Please refer to FIG. 5, the 7 are all configured to detect the touch operation of the first touch object if it is judged in the step S2 that no second touch object is detected. In the present embodiment, assuming four third-type blank periods T3 are continuously being needed to complete detecting the touch operation of the first touch object once, it is not enough to divide into two group to achieve detecting the touch operation of the first touch object twice since there are only 7 third-type blank period T3 in one working cycle T. Then, in the present embodiment, a part of the time of the first-type blank period T1 in a next working cycle T is used to complete detecting the touch operation of the first touch object once together with the last three third-type blank periods T3 in the current working cycle T, wherein the remaining time of the first-type blank period T1 is vacant, and no operation is performed.

It can be seen that if it is judged no in the step S2, that is, there is no second touch object, only one second-type blank period T2 is needed to judge whether the second touch object is detected, and the remaining third-type blank periods T3 can be configured to detect the touch operation of the first touch object, which is conducive to improve a frequency of detecting the first touch object and optimize the user's touch experience.

Please refer to FIG. 3 again, in a modified embodiment of the present disclosure, if it is judged no in the step S2, that is, there is no second touch object, there is no need to detect the touch operation of the first touch object in all third-type blank periods T3. In the modified embodiment, adjacent 3 third-type blank periods T3 can complete detecting the touch operation of the first touch object once. Since one working cycle T includes 7 third-type blank period, it can perform a touch detection of the first touch object twice. One third-type blank period T3 is left, there is no need to use the first-type blank period T1 in the next working cycle T. The touch display device 10 is vacant in the third-type blank period T3 left, that is, the touch display device 10 does not perform any operation. To ensure a uniformity of detecting the touch operation of the first touch object as much as possible, the vacant third-type blank period T3 can be selected as a fifth third-type blank period T3 in the current working cycle T. It should be understood that in the modified embodiment, a number of the third-type blank period T3 required to jointly complete detecting the touch operation of the first touch object is not used to limit the invention. In other embodiments, the third-type blank period T3 required to jointly complete detecting the touch operation of the first touch object is set according to actual needs.

In the modified embodiment above, the third-type blank periods T3 in the working cycle T are not all used to detect the touch operation of the first touch object when it is judged that no second touch object is detected. On a basis of ensuring that the frequency of detecting the touch operation of the first touch object meets a requirement, it is beneficial to save the power consumption of the touch display device 10 by setting a part of the third-type blank periods T3 to be vacant.

In another modified embodiment, the vacant third-type blank period T3 is configured for the touch display device to perform waterproof detection or/and noise detection, which is conducive to improve an accuracy of touch detection of the touch display device.

Embodiment 2

Figure 6:
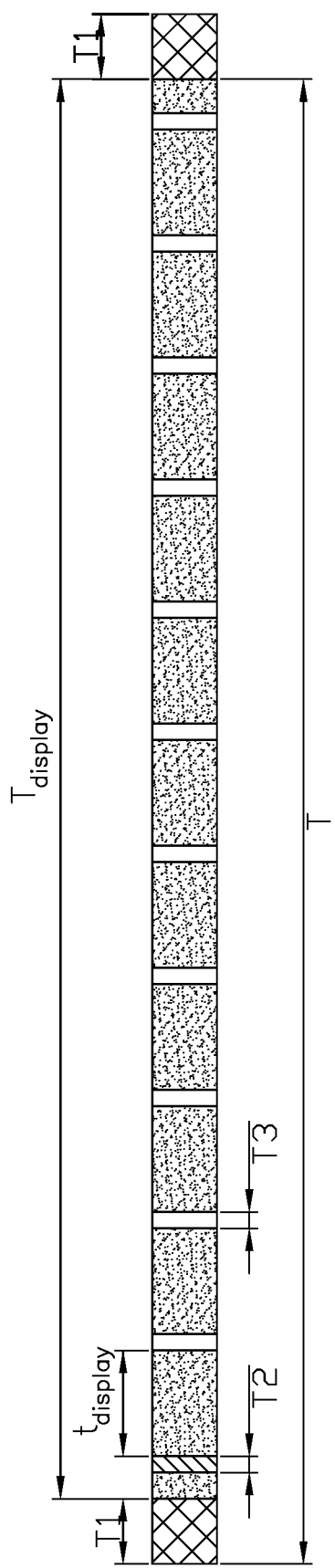
FIG. 6 is a schematic diagram of a touch detection method in a working cycle in a second embodiment of the present disclosure.

Please refer to FIG. 6, a main difference between the touch detection method provided in the embodiment and the first embodiment is that if step S2 is judged to be yes, that is, when there is the second touch object, there is no need to detect the second touch in every third-type blank periods T3, and a part of the third-type blank period T3 are used to detect the touch operation of the second touch object, and the other part of the third-type blank period T3 are used to detect the touch operation of the first touch object. It should be understood that each third-type blank period T3 is only used to detect the touch operation of the first touch object or the touch operation of the second touch object, and there is no condition that one third-type blank period T3 detects the touch operation of both the first touch object and the second touch object. Of course, the present embodiment, a part of the third-type blank periods T3 may be vacant, and the touch display device 10 does not perform any operation during the third-type blank periods T3 in a vacant state.

Please continue to refer to FIG. 6, in the present embodiment, a working cycle T includes one first-type blank period T1 and one display frame $T_{display}$ after the first-type blank period T1. The display frame $T_{display}$ includes 13 display sub-frames $t_{display}$, one second-type blank period T2, and 11 third-type blank periods T3, wherein, the second-type blank period T2 is before the 11 third-type blank periods T3, each second-type blank period T2 and each third-type blank period T3 are between two adjacent display sub-frames $t_{display}$.

In the step S2, if it is judged that no second touch object is detected during the second-type blank period T2, the subsequent 11 third-type blank periods T3 are used to detect the touch operation of the first touch object. Specifically, assuming that six adjacent third-type blank periods T3 are used to jointly complete detecting the touch operation of the first touch object once, 12 third-type blank periods T3 are required to complete detecting the touch operation of the first touch object twice. In the present embodiment, since there are only 11 third-type blank periods T3 in the current display frame $T_{display}$, a part of time in the first-type blank period T1 in the next working cycle T is used to complete touch detection once jointly with the last 5 third-type blank period T3 in the current display frame $T_{display}$, and the remaining time of the first-type blank period T1 is vacant and no operation is performed.

Please continue to refer to FIG. 6, in step S2, if it is judged that the second touch object is detected during the second-type blank period T2, a part of the subsequent 11 third-type blank periods T3 can be set to detect the touch operation of the first touch object, and another part of it is used to detect the touch operation of the second touch object. Specifically, in the present embodiment, two adjacent third-type blank periods T3 jointly complete detecting the touch operation of the second touch object once, wherein the second-type blank period T2 and a first third-type blank period T3 in the current working cycle T jointly complete a first detection of the touch operation of the second touch object, a third third-type blank period T3 and a fourth third-type blank period T3 complete a second detection of the touch operation of the second touch object, a sixth third-type blank period T3 and a seventh third-type blank period T3 complete a third detection of the touch operation of the second touch object, a ninth third-type blank period T3 and a tenth third-type blank period T3 complete a fourth detection of the touch operation of the second touch object. And a second third-type blank period T3, a fifth third-type blank period T3, and an eleventh third-type blank period T3 detect the touch operation of the first touch object once, respectively. Therefore, in the present embodiment, if it is judged that the second touch object is detected during the second-type blank period T2, detecting the touch operation of the second touch object four times in the current working cycle T, and detecting the touch operation of the first touch object twice in the third-type blank period T3. If the first-type blank period T1 completes detecting the touch operation of the first touch object once, three times of detections of touch operation of the first touch object are completed.

It is understandable that, in other embodiments, an allocation method of the above 11 third-type blank periods T3 detecting the first touch object and the second touch object may be different. The allocation method in the present embodiment is conducive to improve a uniformity of touch detection.

In the touch detection method provided in the present embodiment, based on the first embodiment, when it is judged in the second-type blank period T2 that the second touch object is detected, an action method of the subsequent third-type blank periods T3 is set as a part detect the touch operation of the first touch object, and the other part detects the touch operation of the second touch object. It is conducive to improve a detection frequency of the second touch object on one hand, and it is also conducive to improve a detection frequency of the first touch objects.

Embodiment 3

Figure 7:
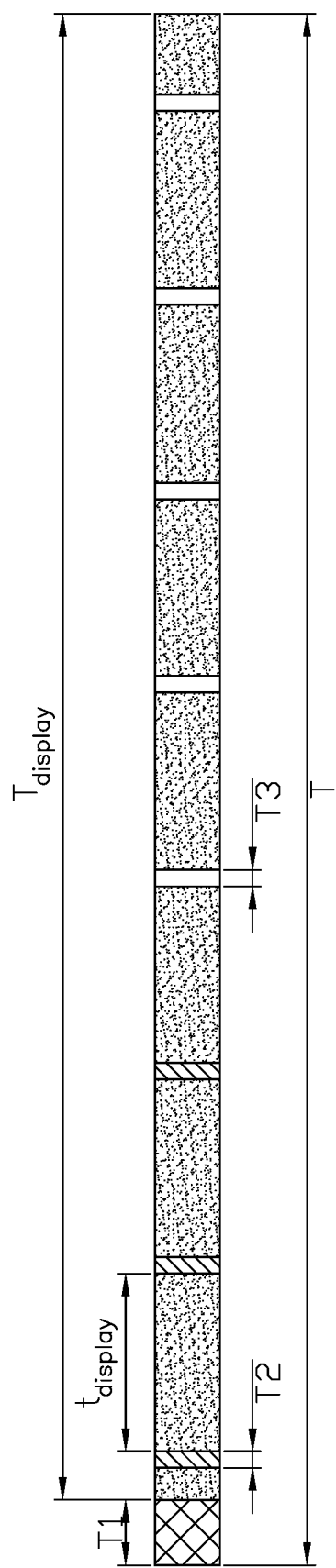
FIG. 7 is a schematic diagram of a touch detection method in a working cycle in a third embodiment of the present disclosure.

Please refer to FIG. 7, a main difference between the touch detection method provided in the present embodiment and the first embodiment is that one display frame $T_{display}$ includes a plurality of second-type blank periods T2 in the present embodiment.

Please continue to refer to FIG. 7, in the present embodiment, in a same working period T, the second-type blank periods T2 precede at least one third-type blank period T3. Each second-type blank period T2 is used to individually judge whether the second touch object is detected once. In the present embodiment, each display frame $T_{display}$ includes 9 display sub-frames $t_{display}$, 3 second-type blank periods T2, and five third-type blank periods T3. Each second-type blank period T2 and each third-type blank period T3 are between two adjacent display sub-frames $t_{display}$. It is finally judged that the second touch object is detected if it is judged that the second touch object is detected in at least two second-type blank periods T2.

Please continue to refer to FIG. 7, in the present embodiment, the subsequent five third-type blank periods T3 are all used to detect the second touch object if it is judged that the second touch object is detected, and the subsequent five third-type blank periods T3 are all used to detect the first touch object if it is judged that no second touch object is detected.

Since two states of operating and leaving of the active stylus on the touch display device 10 are unlikely to switch frequently, based on the first embodiment, the above steps are conducive to further improve stability of touch detection and prevent misjudgment caused by noise according to multiple judgments.

Embodiment 4

Figure 8:
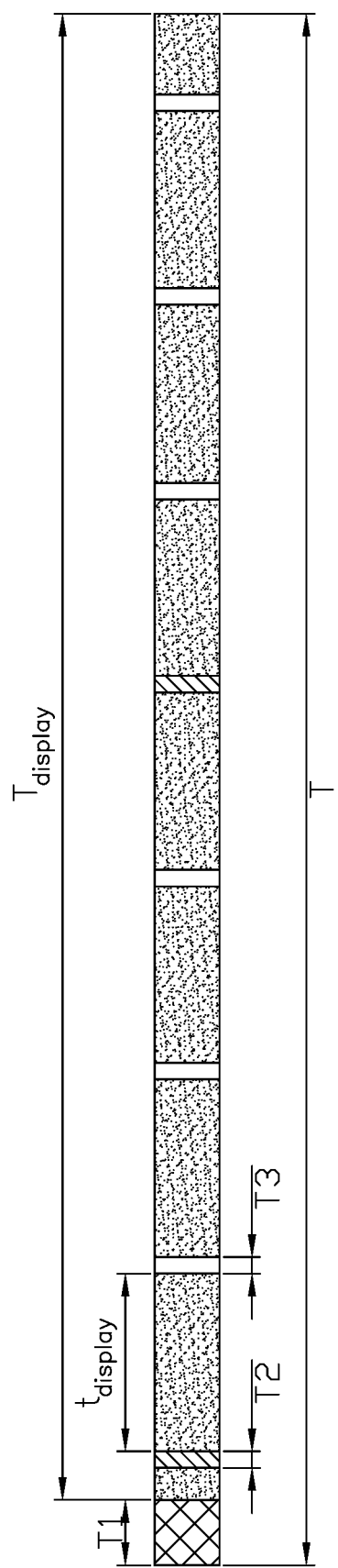
FIG. 8 is a schematic diagram of a touch detection method in a working cycle in a fourth embodiment of the present disclosure.

Please refer to FIG. 8, the touch detection method provided by the present embodiment differs from the third embodiment mainly in that the plurality of second-type blank periods T2 included in one display frame $T_{display}$ are not continuous, and there is at least one third-type blank period T3 between every two adjacent second-type blank periods T2. Each second-type blank period T2 is used to judge whether the second touch object is detected once. According to results of judging of every second-type blank period T2, detecting the touch operation of the first touch object or/and the second touch object in at least a part of the third-type blank periods T3 between two adjacent second-type blank period T2.

In the present embodiment, each display frame $T_{display}$ includes 9 display sub-frames, 2 second-type blank periods T2, and 6 third-type blank periods T3, wherein a first second-type blank period T2 follows the first-type blank period T1 of the current working cycle T, there are three third-type blank periods T3 between the first second-type blank period and the second second-type blank period T2. In the display frame $T_{display}$ above, the other three third-type blank periods T3 are after the second second-type blank period T2.

It is judged once in the above-mentioned first second-type blank period T2 and once in the second second-type blank period T2, respectively. If it is judged that the second touch object is detected in the second-type blank period T2, detecting the touch operation of the second touch object in at least part of the third-type blank periods T3 between adjacent second-type blank periods T2. If it is judged that no second touch object is detected in the second-type blank period T2, detecting the touch operation of the first touch object in at least part of the third-type blank periods T3 between adjacent second-type blank periods T2.

In actual operation, there will be a condition of there is no second touch object during the first second-type blank period T2, and there is the second touch object during the second second-type blank period T2. Therefore, based on the embodiment 2, the above steps of the present embodiment are conducive to detect the second touch object in the current working cycle T and no need to wait to a next working cycle to detect the second touch object by separating the two second-type blank period T2 and judge twice in one working cycle T, which is further conducive to improve an efficiency of touch detection.

And it should be understood that, since a detection accuracy of the touch operation of the second touch object is required higher than a detection accuracy of the touch operation of the first touch object, in all the foregoing embodiments, if it is judged that the second touch object is detected in at least one second-type blank period T2, regardless of how the third-type blank periods T3 in the current display frame $T_{display}$ are allocated (used to detect the first touch object, used to detect the second touch object, or being in a vacant state, etc.), it should satisfy a requirement that a total duration for detecting the touch operation of the second touch object is greater than a total duration for detecting the touch operation of the first touch object.

Embodiment 5

Figure 9:
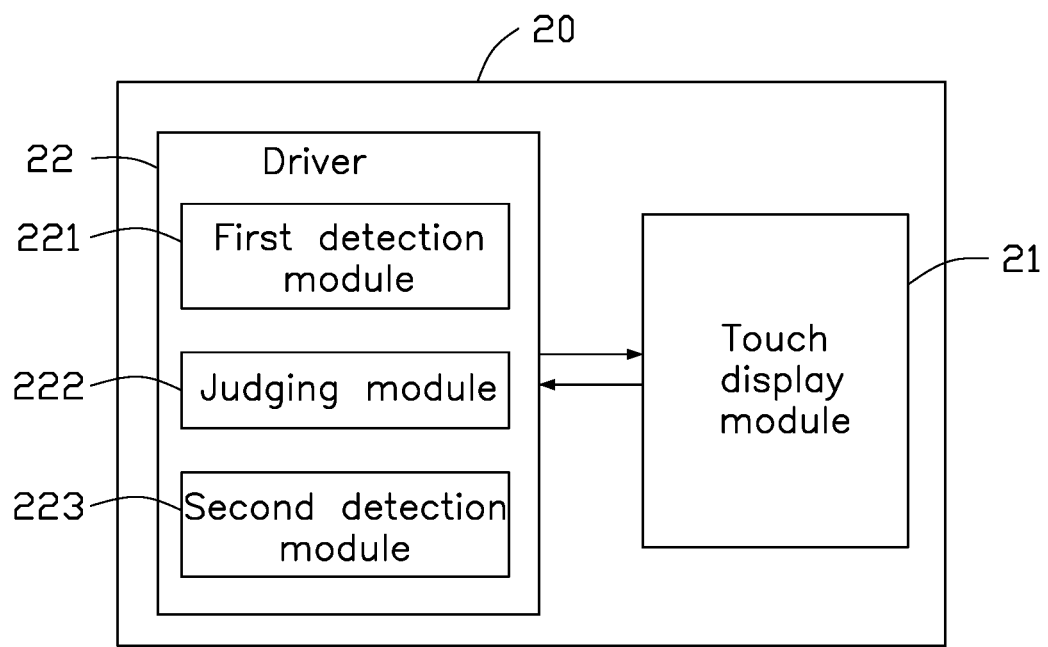
FIG. 9 is a schematic diagram of a module structure of a touch display device in a fifth embodiment of the present disclosure.

Please refer to FIG. 9, the touch display device 20 provided in the present embodiment includes a touch display module 21 and a driver 22.

In the present embodiment, each common electrode 15 in the touch display module 21 is applied with the common voltage when displaying an image, and is used as a touch electrode applied with a touch scanning signal when the touch display device 20 performs touch detection. The driver 22 is a driver chip or a functional unit in a driver chip and can also be a group of driver chips. In one embodiment, the driver 22 is a single driver chip, which can be used as the touch detection driver 14 as shown in FIG. 1, or it can be integrated with the gate driver 12, the source driver 13, and the touch detection driver 14 shown in FIG. 1. In another embodiment, the driver 22 is the group of driver chips including the gate driver 12, the source driver 13, and the touch detection driver 14 as shown in FIG. 1 that are independent with each other.

The touch display device 20 works in a plurality of display frames $T_{display}$. There is one first-type blank period T1 between every two adjacent display frames $T_{display}$. Each display frame $T_{display}$ includes a plurality of display sub-frames $t_{display}$. There is at least one second-type blank period T2 or at least one third-type blank period T3 between every two adjacent display sub-frames $t_{display}$. Each display frame $T_{display}$ includes at least one second-type blank period T2 and at least one third-type blank period T3.

Please continue to refer to FIG. 9, the drive 22 includes:

a first detection module 221 configured to drive the touch display module 21 to detect the touch operation of the first touch object during the at least one first-type blank period T1;

a judging module 222 configured to drive the touch display module 21 to judge whether a second touch object is detected during the at least one second-type blank period T2; and a second detection module 223 configured to drive the touch display module 21 to detect the touch operation of the first touch object or/and the second touch object during at least parts of the third-type blank periods T3 belong to a same display frame $T_{display}$ as the at least one second-type blank period T2 according to a result of judging above. Moreover, in a modified embodiment, the driver 22 is also used to drive the touch display module 21 to display images in each display sub-frame $t_{display}$.

Specific working process of the driver 22 and the touch display device 20 can refer to embodiment 1 through embodiment 4. It should be understood that the driver 22 and the touch display device 20 provided in the present embodiment can implement steps of any one of the touch detection methods in embodiment 1 through embodiment 4, and can achieve all beneficial effects as described in embodiment 1 through embodiment 4 above.

Ordinary technicians in the technical field should realize that the above embodiments are only used to illustrate the present disclosure and not to limit the present disclosure. Appropriate changes made to the above embodiments fall within a protection scope of the present disclosure as long as the changes are within a substantive spirit of the present disclosure.

The invention claimed is:

1. A touch detection method applied in a touch display device, the touch display working during a plurality of display frames, a first-type blank period being between each two adjacent display frames, and each of the plurality of display frames comprising at least one second-type blank period and at least one third-type blank period;

the touch detection method comprising:
detecting a touch operation of a first touch object in at least one of the first-type blank period;
judging whether a second touch object being detected in the at least one second-type blank period; and
according to a result of the judging, detecting the touch operation of the first touch object or/and the second touch object in at least parts of the at least one third-type blank period, wherein the at least one second-type blank period and the at least parts of the at least one third-type blank period are in a same display frame.

2. The touch detection method of claim 1, wherein the touch display device comprises a plurality of common electrodes independent from each other;
the plurality of common electrodes comprises a plurality of rows in a first direction in the at least one second-type blank period, and every two adjacent common electrodes in a same row electrically connected to each other; and
the step of judging whether a second touch object being detected in the at least one second-type blank period comprises:
scanning the plurality of rows to judge whether the second touch object is detected in the at least one second-type blank period.

3. The touch detection method of claim 2, wherein in the at least one third-type blank period, the plurality of common electrodes comprises a plurality of columns in a second direction, every two adjacent common electrodes in a same column are electrically connected to each other;
the step of detecting the touch operation of the first touch object or/and the second touch object in at least parts of the at least one third-type blank period comprises:
scanning the plurality of columns in one of the at least one third-type blank period after the at least one second-type blank period if it is judged in the at least one second-type blank period that the second touch object is detected, wherein detecting the touch operation of the second touch object once is completed in the at least one second-type blank period and the one of the at least one third-type blank period jointly.

4. The touch detection method of claim 1, wherein each of the plurality of display frame comprises a plurality of second-type blank periods, the plurality of second-type blank periods precede the at least one third-type blank period; and
whether the second touch object is detected is judged in each of the plurality of second-type blank period once, it is judged the second touch object is detected if it is judged the second touch object is detected in each of the plurality of the second-type blank period.

5. The touch detection method of claim 1, wherein the step of detecting the touch operation of the first touch object or/and the second touch object in at least parts of the at least one third-type blank period comprises:

detecting the touch operation of the second touch object in the at least one third-type blank period if it is judged the second touch object is detected.

6. The touch detection method of claim 1, wherein each of the plurality of display frames comprises a plurality of second-type blank periods, at least one third-type blank period is between each two adjacent second-type blank periods, whether the second touch object is detected is judged in each of the plurality of second-type blank period once; and the step of detecting the touch operation of the first touch object or/and the second touch object in at least parts of the at least one third-type blank period comprises:

detecting the touch operation of the first touch object and/or the second touch object in at least parts of the third-type blank period between the two adjacent second-type blank periods according to the result of the judging in each of the second-type blank periods.

7. The touch detection method of claim 6, wherein the step of detecting the touch operation of the first touch object and/or the second touch object in at least parts of third-type blank period between two adjacent second-type blank periods according to the result of the judging in each of the second-type blank periods is specifically:

detecting the touch operation of the second touch object in at least parts of the third-type blank period between the two adjacent second-type blank periods if it is judged the second touch object is detected.

8. The touch detection method of claim 1, wherein the step of detecting the touch operation of the first touch object or/and the second touch object in at least parts of the at least one third-type blank period is specifically:

detecting the touch operation of the first touch object in a part of the at least one third-type blank period and detecting the touch operation of the second touch object in the other part of the at least one third-type blank period if it is judged in the at least one second-type blank period that the second touch object is detected;

wherein each of the at least one third-type blank period is configured to detect the touch operation of one of the first touch object and the second touch object.

9. The touch detection method of claim 1, wherein in each of the plurality of display frames, a total duration for detecting the second touch object is greater than a total duration for detecting the first touch object if it being judged that there is the second touch object.

10. The touch detection method of claim 1, wherein the first touch object is configured to receive a scanning signal from the touch display device, and the second touch object is configured to transmit a scanning signal to the touch display device.

11. A driver applied in a touch display device working during a plurality of display frames, a first-type blank period being between each two adjacent display frames, each of the plurality of display frames comprising at least one second-type blank period and at least one third-type blank period;

the driver comprising:

a first detection module configured to detect a touch operation of a first touch object in at least one of the first-type blank period;

a judging module configured to judge whether a second touch object being detected in the at least one second-type blank period; and a second detection module configured to detect the touch operation of the first touch object or/and the second touch object in at least parts of the at least one third-type blank period according to a result of the judging, wherein the at least one second-type blank period and the at least parts of the at least one third-type blank period are in a same display frame.

12. A touch display device working during a plurality of display frames, a first-type blank period being between each two adjacent display frames, each of the plurality of display frames comprising at least one second-type blank period and at least one third-type blank period, the touch display device comprising:

a touch display module; and a driver configured to detect a touch operation of a first touch object in at least one of the first-type blank period, judge whether a second touch object is detected in the at least one second-type blank period, and detect the touch operation of the first touch object or/and the second touch object in the at least one third-type blank period according to a result of the judging, wherein the at least one second-type blank period and the at least one third-type blank period are in a same display frame;

wherein the driver drives the touch display device to display images in the plurality of display frames except the at least one second-type blank period and the at least one third-type blank period.

13. The touch detection method of claim 2, wherein the step of detecting the touch operation of the first touch object or/and the second touch object in at least parts of the at least one third-type blank period comprises:

detecting the touch operation of the second touch object in the at least one third-type blank period if it is judged the second touch object is detected.

14. The touch detection method of claim 3, wherein the step of detecting the touch operation of the first touch object or/and the second touch object in at least parts of the at least one third-type blank period comprises:

detecting the touch operation of the second touch object in the at least one third-type blank period if it is judged the second touch object is detected.

15. The touch detection method of claim 4, wherein the step of detecting the touch operation of the first touch object or/and the second touch object in at least parts of the at least one third-type blank period comprises:

detecting the touch operation of the second touch object in the at least one third-type blank period if it is judged the second touch object is detected.

* * * * *